United States Patent
Kher et al.

(10) Patent No.: US 10,101,467 B2
(45) Date of Patent: Oct. 16, 2018

(54) OPTICAL RARE-EARTH DOPED FIBER LONG PERIOD GRATING BASED IONIZING RADIATION DOSE SENSOR DEVICE

(71) Applicant: Secretary, Department of Atomic Energy, Government of India, Mumbai (IN)

(72) Inventors: Sanjay Kher, Indore (IN); Smita Chaubey, Indore (IN); Jai Kishore, Indore (IN); Srikant M. Oak, Indore (IN)

(73) Assignee: SECRETARY, DEPARTMENT OF ATOMIC ENERGY, GOVERNMENT OF INDIA, Mumbai (IN)

( * ) Notice: Subject to any disclaimer, the term of this patent is extended or adjusted under 35 U.S.C. 154(b) by 6 days.

(21) Appl. No.: 15/234,064

(22) Filed: Aug. 11, 2016

(65) Prior Publication Data
US 2018/0045835 A1    Feb. 15, 2018

(51) Int. Cl.
*G01T 1/02*    (2006.01)

(52) U.S. Cl.
CPC ..................................... *G01T 1/02* (2013.01)

(58) Field of Classification Search
None
See application file for complete search history.

(56) References Cited

U.S. PATENT DOCUMENTS

2004/0036955 A1* 2/2004 Digonnet ........... G02B 6/03638
359/341.1

FOREIGN PATENT DOCUMENTS

CN    101969174 A    2/2011

OTHER PUBLICATIONS

A. Gusarov, et al., "Effect of Gamma-Neutron Nuclear Reactor Radiation on the Properties of Bragg Gratings Written in Photosensitive Ge-doped Optical Fiber", Nucl. Instr. and Meth. in Phys. Res.; B 187; 2002; pp. 79-86.
H. Henschel, et al., "High Radiation Sensitivity of Chiral Long Period Gratings", IEEE Trans. on Nucl. Sci.; vol. 57, No. 5; Oct. 2010; pp. 2915-2922.
S. Kher, et al., "Turnaround-Point Long-Period Fiber Gratings (TAP-LPGs) as High-Radiation-Dose Sensors", IEEE Photonics Tech. Letters; vol. 24, No. 9; May 2012; pp. 742-744.
S. Kher, et al., "Measurement of γ-Radiation Induced Refractive Index Changes in B/Ge Doped Fiber Using LPGs", IEEE Photonics Tech. Letters; vol. 25, No. 21; Nov. 2013; pp. 2070-2073.

(Continued)

*Primary Examiner* — Edwin Gunberg
(74) *Attorney, Agent, or Firm* — Dickinson Wright PLLC (57) ABSTRACT

This invention relates to a sensor device consisting of long period gratings made of rare-earth doped double clad fiber, which is written by $CO_2$ laser irradiation while the fiber is held static, for gamma dose measurement in the range of 150 Gy-2.5 kGy, extendable to 20 kGy, which measurements are real-time and can be from remote locations. The sensor device has high wavelength dip shift sensitivity of at least 2.8 nm/kGy, and its radiation-induced changes are near permanent. The gratings demonstrate negligible temperature sensitivity and the shifts recorded show negligible annealing at room temperature.

4 Claims, 5 Drawing Sheets

Schematic diagram of $CO_2$-Laser based LPFG writing system (56) References Cited

OTHER PUBLICATIONS

S. Kher, et al., "Long-Period Fiber Grating-Based Nuclear Radiation Sensors for High-Level Dose Applications", Instrumentation Science & Tech.; vol. 41, No. 2; 2013; pp. 135-142.

D. Krcmarik et al., "Long-Period Fiber Gratings in Active Fibers—Chapter 5, Current Trends in Short- and Long-Period Fiber Gratings", Dr. Christian Cuadrado-Laborde (Ed.), InTech, DOI: 10.5772/53008; available on-line at http://www.intechopen.com/books/current-trends-in-short-and-long-fiber-grantings/long-period-fiber-grantings-in-active-fibers; pp. 87-104.

M.C. Paul et al., "Gamma Ray Radiation Induced Absorption in Ti Doped Single Mode Optical Fibres at Low Dose Levels", Optical Materials; vol. 29; 2007; pp. 738-745.

\* cited by examiner

Fig.1. Schematic diagram of $CO_2$-Laser based LPFG writing system

Fig.2: Transmission spectrum of long period fiber grating in rare earth doped fiber with grating period 400 micron and length 24mm: Trace A is transmission spectrum of Yb-doped pristine fiber; Trace B represents the transmission spectrum after grating incorporation using a $CO_2$ laser.

Fig. 3. Transmission spectrum of LPFG in rare earth doped fiber at different radiation doses. Trace A: Source spectrum without LPFG; Trace B : Spectrum after inscription of LPFG (No Dose); Trace C : 450 Gy; Trace D : 900Gy Fig. 4. Transmission spectrum of LPFG in rare earth doped fiber at different radiation doses; A : Source spectrum without LPFG; B : Spectrum after inscription of LPFG (No Dose); C : 2.7 kGy; D : 4.5 kGy Fig. 5. Calibration curve for Gamma radiation response of rare earth doped LPFG; 150Gy -2700 Gy Fig. 6: Thermal response of LPFG: Trace A is at room temperature and the Trace B is recorded at 75 °C. The measured sensitivity is + 0.05 nm/ °C in 27-75 °C range Fig. 7. Fiber grating LINAC-dose calibrating curve for dose up-to 10 kGy Fig. 8: Standard dose measurement using alanine pellets Fig. 9: Tests with 3 Nos. LPFGs sensors in Yb doped fiber, With Linear fitting, Average sensitivity: 2.55 nm/kGy upto 3.6 kGy gamma dose. Standard deviation of these 3 LPFGs for a particular dose is 0.52 nm.

Fig. 10: Typical calibration curve for white X-ray beam on $CO_2$ laser written gratings in test fiber (The exact dose was measured off-line with radio chromic films and pellets kept adjacent to fiber sensor using EPR system).

OPTICAL RARE-EARTH DOPED FIBER LONG PERIOD GRATING BASED IONIZING RADIATION DOSE SENSOR DEVICE

FIELD OF THE INVENTION

This invention relates primarily to fiber optic sensors, fiber lasers, radiation and food processing, reactors, nuclear waste treatment, X-ray sources amongst others.

BACKGROUND OF THE INVENTION

The current state of art for ionizing radiation-dose measurement in the range of 150 Gy-20 kGy (One Gray (1 Gy) corresponds to radiation absorbed dose equal to energy deposition of 1 Joule/kg. of material, 1 Gy=100 Rad) permits only off-line dose measurement. The currently used standard techniques used in industry are as follows:

1. Sachets containing dyed Perspex (PMMA), which darkens quantitatively when irradiated, and when measured by spectrophotometry yields a precise measure of dose. In another version, a radio chromic film cast from polyvinyl butyral (PVB) resin mixed with proprietary dye is used. Ionizing radiation activates the dye centers and causes a predictable color change that is related to absorbed dose.
2. Blister-packed pellets, which exploit the dose-dependence of paramagnetic resonance of alanine over a wide dose range. When pellets containing amino acid alanine are irradiated, stable free radicals are produced in a concentration, which depends on the exposure. The measured response to microwaves of the pellet placed in magnetic field of a paramagnetic resonance spectrometer is quantitatively related to radiation dose.

The techniques listed under S. No. 1 and S. No. 2 are off-line measurement techniques and takes about half an hour to use the supplied equipment. They also require heat treatment for stabilization. These are critical limitations on their usage.

Further, these sensors use either the sealed laminate sachets or pellets, whose shape or size cannot be changed, which limits its application at site.

The irradiated pellets are required to be heated in an oven before the response is measured, and also the sachets/films are also subjected to post-irradiation heat treatment for stable response, which is not viable in commerce.

Specifically, the technique listed at S. No. 1 is an intensity based measurement that depends on photo-darkening measured by spectrophotometer. This technique, therefore, requires careful preservation of the irradiated sachets. Similarly, the alanine pellet based method listed at S. No. 2 is also based on concentration of radiation-induced free radicals. Resultantly, both these techniques are sensitive to source misalignment and power fluctuation.

Other techniques used in prior art are very sensitive to temperature (cross sensitivity), have broad resonance features (~20 nm FWHM) and hence are not suitable for low dose applications (<1 kGy). As a result, they do not provide good accuracy for wavelength dip measurement, amongst other limitations.

Aims and Objectives of the Invention

The fundamental objective of this invention is to disclose a novel optical rare-earth doped fiber long period grating based ionizing radiation dose sensor device, which gives real-time data measurements from remote locations.

Another objective of this invention is to disclose a sensor device consisting of a long period fiber grating (LPFG) written by $CO_2$ laser in rare-earth doped double clad fiber, which grating shows measurable changes in resonance dip wavelength shift (RWS) upon irradiation with gamma radiation, and which grating shows a high radiation sensitivity of at least 2.8 nm/kGy and negligible temperature sensitivity.

Another objective of this invention is to disclose a sensor device that permits the use of the gratings disclosed above for gamma dose measurement in the range of 150 Gy-2.5 kGy (extendable to 20 kGy), in which the radiation-induced changes are near permanent.

Specifically, an objective of this invention is to disclose a sensor device that consists of $CO_2$ laser written long period gratings in Yb-doped alumino-silicate fiber ($SiO_2$—$Al_2O_3$—$Yb_2O_3$—$P_2O_5$) with a nominal maximum length of 25 mm and a period of 400-500 micron, which has a wavelength dip shift sensitivity of at least 2.8 nm/kGy (dose range 150 Gy-2.5 kGy, dose rate 900 Gy/Hour), which gratings show a temperature sensitivity of 0.05 nm/° C.

Another objective of this invention is to disclose a packaged grating sensor device in various enclosures/shapes using grating elements described above for gamma dose measurement for range 150 Gy-2.5 kGy.

Another objective of this invention is to disclose a sensor device that can be used for soft and hard X-ray dose measurements.

Yet another objective of this invention is to disclose a sensor device that can be used for high energy electron beam based dose sensing for agricultural/food irradiation applications.

Another objective of this invention is to disclose a sensor device whose gratings are written in very short length active fiber (4-5 inches) with a core composition of aluminophosphosilicate containing ytterbium.

Yet another objective of this invention is to disclose a sensor device that can be widely used in industry.

DESCRIPTION OF THE INVENTION

Long period fiber gratings (LPFGs) that satisfy the phase matching condition between fundamental core mode and a set of forward propagating cladding modes in an optical fiber are of interest for making devices in the field of optical fiber sensors. As a precursor to practical device design, ease of fabrication, low cost, high sensitivity and reduced cross sensitivity are important considerations.

It is well known that resonance wavelength λ of a LPFG with period Λ is determined by phase matching condition.

$$\lambda = [n_{core}^{eff} - n_{clad,n}^{eff}]\Lambda \quad (1)$$

where $n_{core}^{eff}$, $n_{clad,m}^{eff}$ are effective indices of fundamental core mode and the $m^{th}$ cladding mode, respectively. Most LPFGs in the past have been fabricated using UV based point-by-point writing method. The UV based method requires expensive laser system, post annealing and there are issues of thermal stability and hydrogen handling of such gratings.

Figure 1:
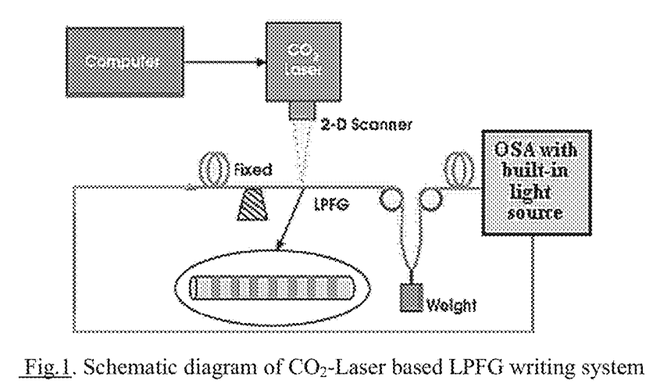
FIG. 1 shows the fabrication system proposed in this invention, which is based on two dimensional scanning of $CO_2$ laser beam.

The fabrication system proposed in this invention, which is based on two dimensional scanning of $CO_2$ laser beam, is shown in FIG. 1.

This invention utilizes fiber gratings written in active, non-photosensitive rare-earth-doped fiber. The single mode fibers and large mode area fibers used are preferably doped in Yb-doped alumino-silicate fiber ($SiO_2$—$Al_2O_3$—$Yb_2O_3$—$P_2O_5$), with a long period grating of nominal maximum length of 28 mm and a period of 400-500 micron. The cladding comprises fluorine doped silica. The grating period (perturbations) of the gratings is in the range of 350-500 µm and maximum length of grating zone is 30 mm. The gratings can also be written in short length active fiber (4-5 inches) with a core composition of aluminophosphosilicate containing ytterbium.

One end of the employed fiber is fixed and another end is attached to a small weight to provide a constant pre-strain in the fiber. The sharply focused modulated $CO_2$ laser pulses are scanned across the fiber by means of two-dimensional scanners under computer control, while monitoring the grating formation in real time. Such a precision controlled system, where the fiber is not periodically moved, can write high quality LPFGs with a nearly zero insertion loss. In an exemplary embodiment, the diameter of focused $CO_2$ laser beam spot is about 100 micron, the line speed is 60 mm/s (variable), the pulse repetition rate is 2 KHz and the average output power is about 1 W. Attenuation bands in the range of 950-1700 nm have been investigated by an Optical spectrum analyzer with a wavelength resolution of 0.1 nm.

The gratings are generally neither processed after fabrication nor coated with any material. The gratings are enclosed in thin silica capillaries, fusion spliced to gamma resistant fibers, covered with gamma compatible PU tubing and packaged in metallic enclosure/silica tube/modified Teletector-Head for extendable arm-design for dose sensing.

The standard dose range with linear response is 150 Gy to 2.5 kGy which is extendable to 25 kGy with supplied dose calibration curve.

Figure 2:
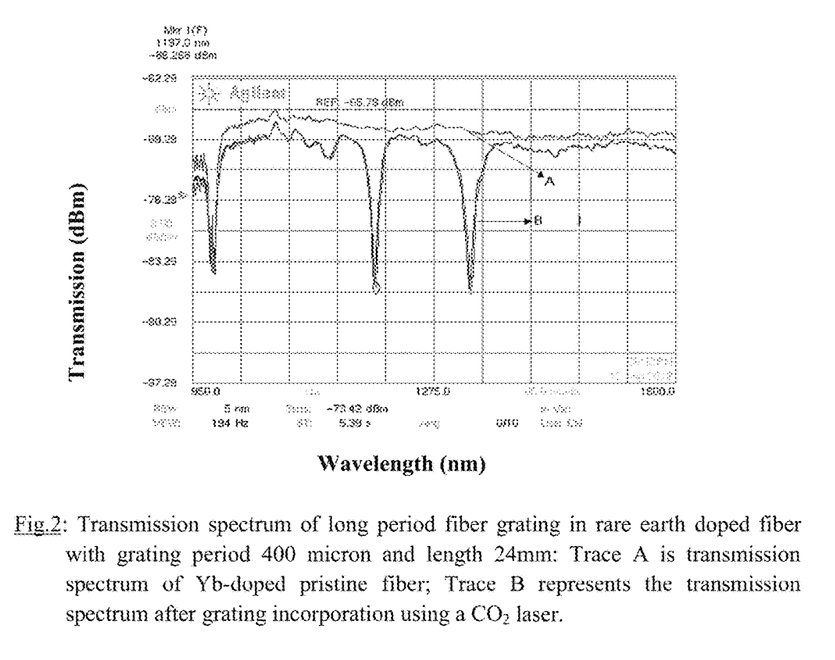
FIG. 2 shows the Transmission spectrum of long period fiber grating in rare earth doped fiber with grating period 400 micron and length 24 mm. The trace A is transmission spectrum of Yb-doped pristine fiber. The trace B represents the transmission spectrum after grating incorporation using a $CO_2$ laser.

From FIG. 2, it can be seen that LPFG with two resonant dips representing two cladding modes (1197 nm, 1330 nm) is formed with dip strength of >15 dB and low insertion loss. One can use any of the dips, but for accurate dose measurement, the narrower peak is used.

To perform gamma-irradiation calibration studies, a 7 cm long part of the sensitive fiber with about 25 mm long non-recoated LPG was covered with a thin capillary and placed on a metallic sample holder in a 280 µm wide groove (the fiber diameter being 245±12 µm) and fixed under a slight tension at two points about 5 cm apart, the grating with glass-ceramic epoxy Resbond 989 FS (Cotronics, USA). The fiber with the LPFG was connected to the OSA through splicing 4 m long pure silica core and fluorine doped cladding radiation resistant fiber for in situ transmission monitoring. The sample holder was placed in a $Co^{60}$ irradiator (BRIT, Gamma Chamber-900) delivering a dose rate of 900 Gy/h. The transmission measurements started 24 hours before gamma irradiation. The spectra were recorded at several doses 150 Gy, 300 Gy, 450 Gy, 900 Gy etc. The OSA was kept "on" during a full day time for recording.

Figure 3:
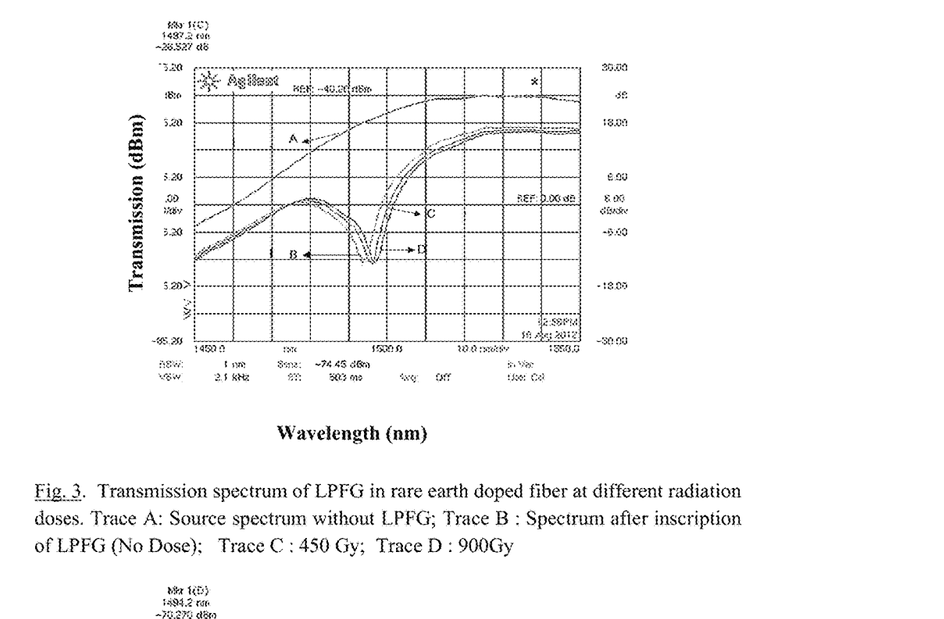
FIG. 3 shows the transmission spectrum of LPFG in rare earth doped fiber at different radiation doses. Trace A (Topmost curve) is the source spectrum without LPFG. Trace B is the spectrum after inscription of LPFG (No Dose). Trace C is 450 Gy. Trace D is 900 Gy.
Figure 4:
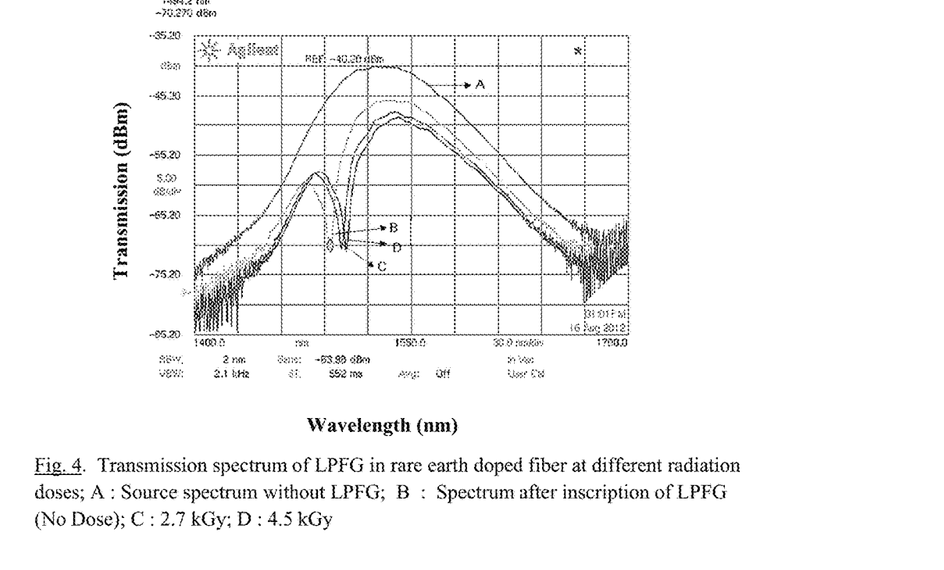
FIG. 4 shows the transmission spectrum of LPFG in rare earth doped fiber at different radiation doses; Trace A is the source spectrum without LPFG. Trace B is the spectrum after inscription of LPFG (No Dose). Trace C is 2.7 kGy. Trace D is 4.5 kGy.

FIG. 3 and FIG. 4 describe the gamma irradiation effect on LPFG. It is observed that the RWS shifts to longer wavelength (red side) with increasing dose from '0' to '4.5 kGy'. The LPFG ionizing radiation sensitivity can be quantified with resonance wavelength dip shift (RWS), the dip width and amplitude modifications. The RWDS is often considered as most interesting and important as they directly reflect the changes in the refractive index of the grating. The dose measurement of this invention is based on RWS in long period gratings written in Yb-doped silica fiber. The radiation-induced RWS $DI_D^i$ for a $i^{th}$ cladding mode is given by the relation, which follows from the LPG resonance wavelength definition:

$$DI_D^i = I_D^i \left( \frac{Dn_{co,eff} - Dn_{cl,eff}^i}{n_{co,eff} - n_{co,eff}^i} + \frac{DL}{L} \right),$$

where $I_D^i$ and $DI_D^i$ is the dip wavelength and its shift under radiation, Λ and ΔΛ are the grating period and its change; $n_{co,eff}$, $n_{cl,eff}^i$ and $\Delta n_{co,eff}$, $\Delta n_{ci,eff}^i$ are the effective indices and their changes due to gamma dose of the core and $i^{th}$ cladding mode, respectively; $\Delta n_{eff} = \Delta n_{co,eff} - \Delta n_{ci,eff}^i$. In actual practice, a dip, which is narrow and of high strength for dose measurement, is chosen. For doses below 100 kGy, for silica fiber, grating period changes can be ignored and the effect of shift of resonance dips due to Gamma irradiation in LPFG is attributed to refractive index changes in the fiber material.

Figure 5:
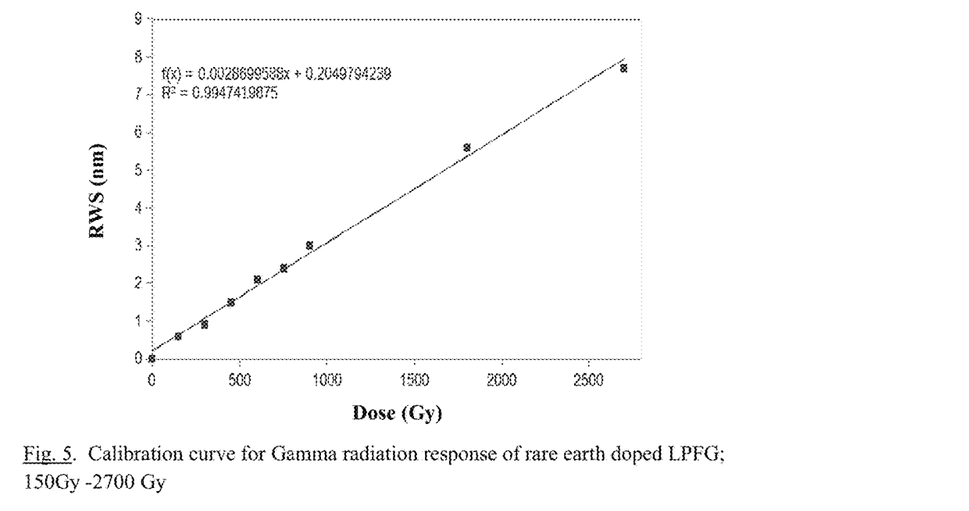
FIG. 5 shows the calibration curve for Gamma radiation response of rare earth doped LPFG; 150 Gy-2700 Gy.
Figure 6:
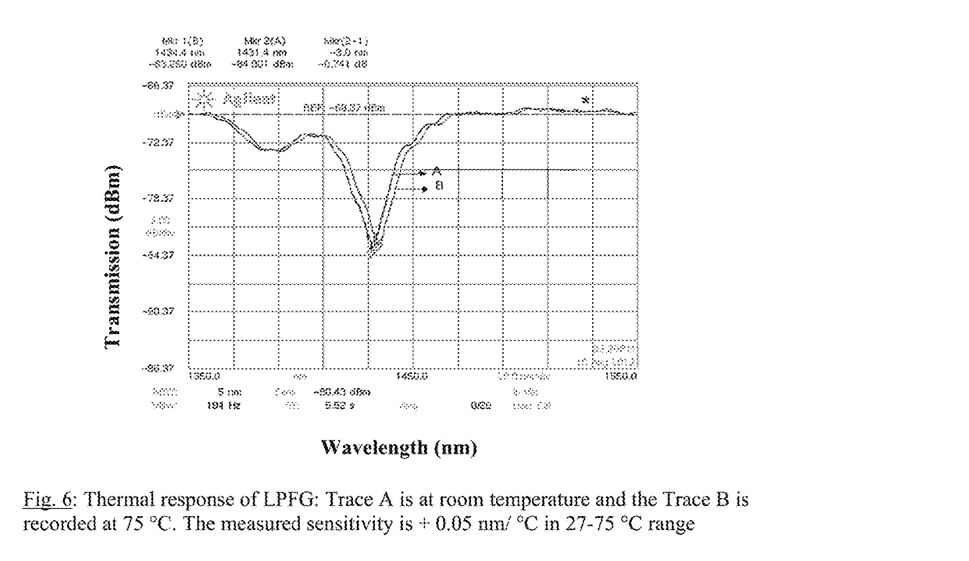
FIG. 6 shows the thermal response of LPFG. Trace A is at room temperature and the trace B is recorded at 75° C. The measured sensitivity is +0.05 nm/° C. in 27-75° C. range.

FIG. 5 shows the near linear variation of dose versus RWS for range 0-2.7 kGy. It can be observed that after a dose of 2.5 kGy, the sensor probes incorporating these gratings show radiation induced changes of their transmission resonance wavelength dip of up-to 7 nm. The changes are near-permanent. These gratings are also found to be insensitive to temperature (0.05 nm/° C.) and are thus useful in actual field conditions (See FIG. 6).

The Gamma radiation sensitivity of $CO_2$ laser written LPFGs in specialty rare earth doped fibers can be used for real-time dose measurements during processing of fruits, vegetables, seeds, pulses, condiments and medical appliances. These probes are designed with standard dose range of 150 Gy-2.5 kGy, although 100 Gy-20 kGy may also be achieved.

Food irradiation is the process of exposing foodstuffs to a source of energy capable of stripping electrons from individual atoms. This treatment is used to preserve food, reduce the risk of food borne illness, prevent the spread of invasive pests, and delay or eliminate sprouting or ripening. Irradiated foodstuff does not become radioactive. The sensor disclosed in this invention is useful for dose measurements required for stopping of insect/parasitic infestation, reducing the risk of pathogens in meat, increase of sanitation of spices, amongst others. It also has an important application for dose measurement near canisters in Nuclear waste immobilization plant where there is no direct dosimetry system available.

Its use can be expanded for sterilization of medical products such as hypodermic needles, surgical sutures, blood handling equipment, implant substances and tissues, surgical gloves and utensils, catheters, dental supplies, etc.

The sensor device disclosed in this invention can also be used for soft and hard X-ray dose measurements.

Some Comparative Data of New Sensor Vis-à-Vis Commercially Available Systems

I. On-line dose measurements in 10 MeV electron LINAC were performed in IMA building using fiber grating sensors. The sensors were directly irradiated with 8 MeV pulsed electron beam operating at 5 Hz repetition rate. The beam parameters are described below:

| S. No. | Parameter | Value |
|---|---|---|
| 1. | Beam energy | 7.8 MeV |
| 2. | Peak current | 470 mA |
| 3. | Pulse width | 11 μs |
| 4. | Pulse repetition rate | 5 Hz |
| 5. | Average beam power | 200 W |
| 6. | Foil to sensor distance | 80 cm |

Alanine EPR dosimetry system (calibration traceable to NPL UK), was used to measure the dose delivered to the fiber optic sensor. The fiber grating sensor was mounted on an aluminium substrate plate of thickness ~5 mm inside a slot (2 mm×20 mm). The Alanine pellets were placed in similar slot made on identical aluminium phantom plate. Both plates (one containing fiber sensor and another Alanine pellets) were placed adjacent to each other in the stationary radiation field of electron beam. The expected dose rate for the planned experimental geometry at above mentioned parameter was as high as 22 kGy/minute. Different doses up to 42 kGy were delivered by controlling the beam 'ON' time. After each pre-specified irradiation time, one dosimeter pellet was removed and analyzed off-line for dose delivered to the fiber sensor.

Figure 7:
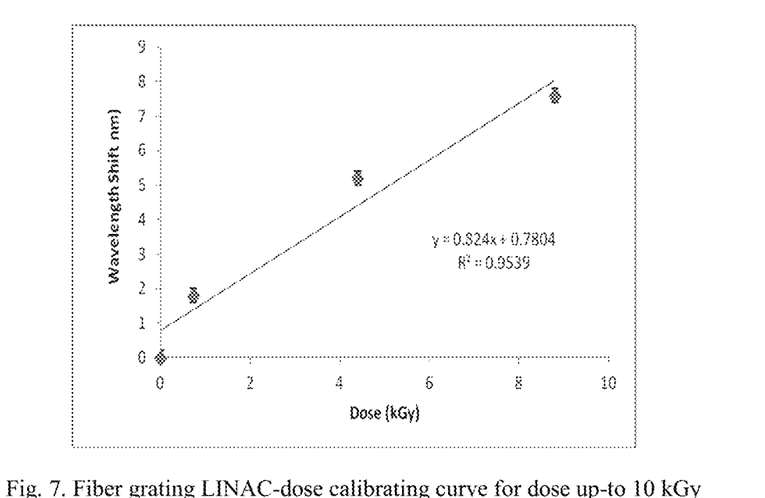
FIG. 7 shows the fiber grating LINAC (10 MeV Linear Electron Accelarator)-dose calibrating curve for dose up-to 10 kGy.

II. Irradiation causes changes in the fiber grating sensor due to various physical mechanisms, which is measured in terms of the shift in resonance wavelength. FIG. 7 shows the resonance wavelength shift versus dose. The solid line is drawn for best fit of the measured values. Near linear variation is observed up-to a dose of 10 kGy with a resolution of 100 Gy.

Figure 8:
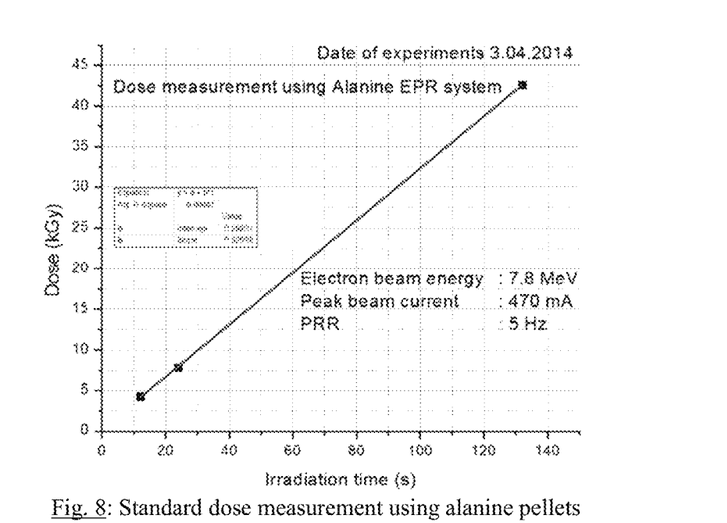
FIG. 8 shows the standard dose measurement using alanine pellets.

III. FIG. 8 describes the calibration technique. The sensor device disclosed in this invention are also found to be useful for pulsed e-beam dose measurements. It was shown that it is possible to measure a dose delivered by 10 electron beam pulses (10 micro-sec, 5 Hz repetition rate) arriving within two seconds reliably. This capability can prove to be very significant to provide an early warning during nuclear accidents when there is a sudden burst of activity for a very short duration.

Figure 9:
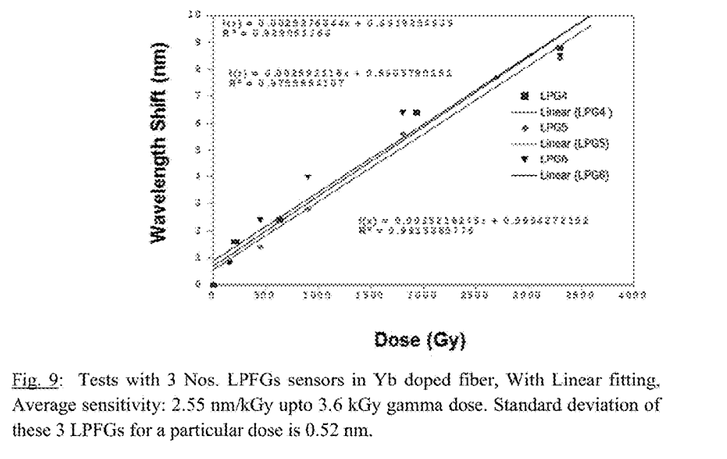
FIG. 9 shows the tests with 3 Nos. LPFGs sensors in Yb doped fiber, With Linear fitting, Average sensitivity: 2.55 nm/kGy upto 3.6 kGy gamma dose. Standard deviation of these 3 LPFGs for a particular dose is 0.52 nm.

IV. The wavelength encoded fiber gratings in rare earth doped fiber of this invention have been developed for nuclear waste processing and fruit ripening control applications. The dose was calibrated by chemical dosimetry and pellet based paramagnetic resonance. Three sensors were tested under gamma dose for repeatability. The results are represented in FIG. 9.

Figure 10:
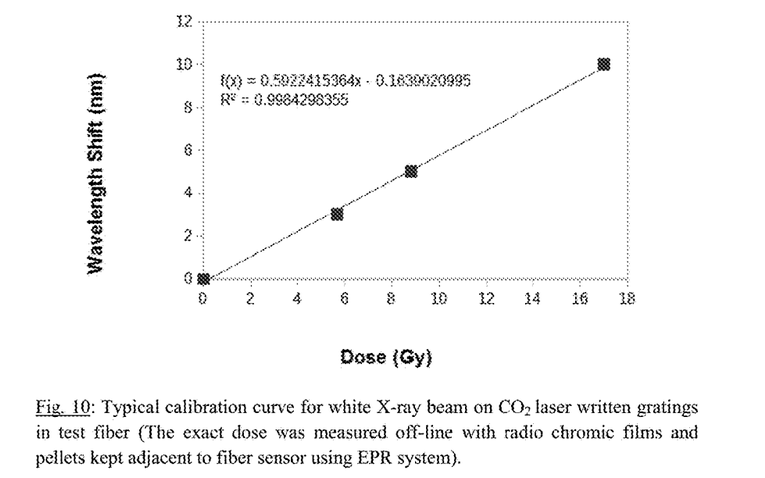
FIG. 10 shows the typical calibration curve for white X-ray beam on $CO_2$ laser written gratings in test fiber. The exact dose was measured off-line with radio chromic films and pellets kept adjacent to fiber sensor using EPR (Electron Paramagnetic Resonance) system.

V. The fiber grating dose sensors of this invention were irradiated in Indus-2 X-ray Lithography beamline with energy 3-50 keV. The results are represented in FIG. 10.

As such, the main advantages flowing from the invention are that it is a wavelength encoded sensor device, which has remote, real-time dose measurement capability. Given that the probe size is small (30 mm×250 micron), it can be placed or inserted in a given location on packaging. The sensor device does not require any post irradiation heat treatment either. Further, the sensor has negligible temperature sensitivity. Moreover, the reported high radiation sensitivity of 2.8 nm/kGy opens up this field for development of grating based dose sensor for medical/cancer applications.

All percentages, preferred amounts or measurements, ranges and endpoints thereof herein are inclusive. One Gray (1 Gy) corresponds to radiation absorbed dose equal to energy deposition of 1 Joule/Kg. of material. Numbers herein have no more precision than stated. All amounts, ratios, proportions and other measurements are by weight unless stated otherwise. All percentages refer to weight percent based on total composition according to the practice of the invention unless stated otherwise. Except in the examples, or where otherwise indicated, all numbers expressing quantities, percentages, functionalities and so forth in the specification are to be understood as being modified in all instances by the term "about." Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. Unless stated otherwise, when an element, material, or step capable of causing undesirable effects is present in amounts or in a form such that it does not cause the effect to an unacceptable degree it is considered substantially absent for the practice of this invention. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The foregoing description will so fully reveal the invention according to the conceptual point of view, so that others, by applying current knowledge will be able to modify and/or adapt, for various applications, such an invention without further research and without parting from the invention, and it is therefore to be understood that such adaptations and modifications will have to be considered as equivalent to this invention. The means and the materials to realise the different functions described herein could have a different nature without, for this reason, departing from the field of the invention. It is to be understood that the phraseology or terminology employed herein is for the purpose of description and not for limitation. It will also be apparent to those skilled in the art that other embodiments, improvements, details and uses can be made consistent with the letter and spirit of the foregoing disclosure and within the scope of this patent.

We claim:

1. A sensor device capable of gamma dose measurement consisting of:
   long period gratings made from active non-photosensitive rare-earth doped double clad fibers, which are written by XY scanning $CO_2$ laser irradiation;
   wherein said fibers have a length of from 6 cm to 9 cm and have a grating zone, defined as an area on a fiber wherein exposure to said $CO_2$ laser irradiation has changed a refractive index of said fiber, having a length of from 20 mm to 30 mm with a period of from 400 to 500 microns.

2. A sensor device, as claimed in claim 1, in which the fibers comprise a non-photosensitive rare earth doped material core comprising phosphosilicate.

3. A sensor device, as claimed in claim 1, which has a high wavelength dip shift sensitivity of around 2.8 nm/kGy.

4. A sensor device, as claimed in claim 1, whose gratings neither require annealing nor recoating after grating incorporation, nor any post processing heat treatment, prior to its use for measurement of gamma dose.

* * * * *